US010639651B2

(12) United States Patent
Yoavaphankul

(10) Patent No.: US 10,639,651 B2
(45) Date of Patent: May 5, 2020

(54) MULTI-STAGE AXIAL FLOW CYCLONE SEPARATOR

(71) Applicant: Luxnara Yaovaphankul, Bangkok (TH)

(72) Inventor: Metha Yoavaphankul, Bangkok (TH)

(73) Assignee: Luxnara Yaovaphankul (TH)

(*) Notice: Subject to any disclaimer, the term of this patent is extended or adjusted under 35 U.S.C. 154(b) by 230 days.

(21) Appl. No.: 15/577,934

(22) PCT Filed: Feb. 8, 2016

(86) PCT No.: PCT/TH2016/000009
§ 371 (c)(1),
(2) Date: Nov. 29, 2017

(87) PCT Pub. No.: WO2016/195602
PCT Pub. Date: Dec. 8, 2016

(65) Prior Publication Data
US 2018/0161785 A1 Jun. 14, 2018

(30) Foreign Application Priority Data

Jun. 2, 2015 (TH) .............................. 1501003008

(51) Int. Cl.
*B01D 45/00* (2006.01)
*B04C 3/06* (2006.01)
(Continued)

(52) U.S. Cl.
CPC .............. *B04C 3/06* (2013.01); *B01D 21/267* (2013.01); *B01D 45/08* (2013.01); *B01D 45/12* (2013.01); *B01D 45/16* (2013.01); *B04C 3/04* (2013.01); *B01D 50/002* (2013.01); *B04C 2003/006* (2013.01); *F01M 13/04* (2013.01)

(58) Field of Classification Search
CPC ....... B04C 3/06; B04C 2003/006; B04C 3/04; B04C 7/00; B01D 21/267; B01D 45/16;
(Continued)

(56) References Cited

U.S. PATENT DOCUMENTS 1,735,298 A * 11/1929 Pfeffer ...................... B04C 3/04
                                                            55/343
3,915,679 A * 10/1975 Roach ....................... B04C 3/04
                                                            55/347
(Continued)

FOREIGN PATENT DOCUMENTS

CN        102369407    3/2012
TH           41173     8/2014

OTHER PUBLICATIONS

International Search Report and Written Opinion of International Application No. PCT/TH2016/000009 dated Aug. 29, 2016.

*Primary Examiner* — Dung H Bui
(74) *Attorney, Agent, or Firm* — Kim IP Law Group PLLC

(57) ABSTRACT

A multi-stage axial flow cyclone separator comprising a primary swirl creating section, a swirl acceleration section, and a fluid separation section is disclosed. A fluid transfer tube is mounted axially in the middle of the inside of an outer structure of the fluid separation section for separating the light phase fluid and transferring it through an open end. Additionally, the swirl acceleration section and the fluid separation section can be annexed to a multi-stage axial flow cyclone separator according to the present invention to increase the velocity of the swirl and to increase the residence time to improve separation efficiency as desired.

15 Claims, 3 Drawing Sheets

(51) Int. Cl.
  *B01D 45/16*  (2006.01)
  *B04C 3/04*  (2006.01)
  *B01D 45/08*  (2006.01)
  *B01D 45/12*  (2006.01)
  *B01D 21/26*  (2006.01)
  *B04C 3/00*  (2006.01)
  *B01D 50/00*  (2006.01)
  *F01M 13/04*  (2006.01)

(58) Field of Classification Search
  CPC ........ B01D 21/26; B01D 45/08; B01D 45/12; B01D 50/002; F01M 13/04
  See application file for complete search history.

(56) References Cited

U.S. PATENT DOCUMENTS

| | | | |
|---|---|---|---|
| 4,289,611 A | 9/1981 | Brockmann | |
| 4,643,158 A * | 2/1987 | Giannotti | F02M 33/04 123/591 |
| 5,320,653 A * | 6/1994 | Morgan | B01D 46/2411 55/337 |
| 5,603,825 A | 2/1997 | Costinel | |
| 5,690,709 A * | 11/1997 | Barnes | B01D 45/12 55/318 |
| 7,244,282 B2 * | 7/2007 | Greif | B01D 45/16 123/198 E |
| 7,691,185 B2 | 4/2010 | Darke et al. | |
| 7,879,123 B2 * | 2/2011 | Lundquist | B04C 3/00 55/306 |
| 2012/0042909 A1 * | 2/2012 | Studebaker | A47L 5/225 134/21 |
| 2012/0103423 A1 * | 5/2012 | Schook | B01D 45/16 137/1 |
| 2014/0116255 A1 * | 5/2014 | Perez Guerra | B04C 3/00 96/216 |
| 2014/0283689 A1 * | 9/2014 | Guerry | B01D 45/08 95/284 |
| 2015/0273484 A1 * | 10/2015 | Ho | B01D 45/16 55/321 |

* cited by examiner

MULTI-STAGE AXIAL FLOW CYCLONE SEPARATOR

CROSS-REFERENCE TO RELATED APPLICATIONS

This application is a national phase application under 35 U.S.C. § 371 of International Application No. PCT/TH2016/000009 filed Feb. 8, 2016, which claims priority to Thailand Patent Application No. 1501003008 dated Jun. 2, 2015, the entire disclosures of which are hereby incorporated by reference in their entirety.

FIELD OF THE INVENTION

This invention involves a multi-stage axial flow cyclone separator.

BACKGROUND OF THE INVENTION

The present invention involves a high performance cyclone separator which is a multi-stage axial flow cyclone separator used for separating heterogeneous mixture of fluid dispersion, both in continuous phase and discontinuous phase which are not efficiently performed by conventional cyclone separator.

Although the widely used cyclone separator can be produced with low cost compared with other fluid separation method, its limitation is low separation efficiency especially when used with heterogeneous mixture of fluid in continuous phase, e.g., milk, latex, and the like which cannot be efficiently separated by conventional cyclone separator. The disadvantage of the conventional cyclone separator is that it operates as a single process, i.e., there is only one source of dynamic force for creating a swirling flow which injects fluid tangentially to the internal wall of the cylindrical chamber, and the swirling flow thus generated is a free vortex, i.e., a swirling flow swirling toward its center, which creates a higher accelerating centrifugal force near the center as opposite to the distribution of the fluid when has been applied with a centrifugal force. The separation doesn't occur in this portion but at the position where the swirling flow reaches the end of the cone and a counter-swirl occurs as a force vortex. The heavy phase is separated via the under flow and the light phase is separated via the upper flow. The process ends with no possibility to increase separation efficiency by further connecting multiple cyclones to increase swirling velocity and residence time. As in generating a swirling flow by injecting fluid via a tangential inlet of a conventional cyclone when several cyclones are connected, the preceding swirl will not be sustained and the whole process has to be restarted since concerning the flow from the upper outlet of preceding cyclone into a tangential inlet of subsequent cyclone, the preceding swirling flow will be destroyed by tangential flow in the cylindrical wall of the subsequent cyclone.

U.S. Pat. No. 4,289,611 A disclosed an invention of a multi-stage cyclone separator for filtering dust in air. The dust filter has a shape of 2 cylindrical tubes longitudinally coupled to each other, helical blades being mounted in both cylindrical tubes, a coaxial second cylindrical tube being inserted in the outlet end of the first cylindrical tube, the second cylindrical tube being smaller to a certain extent than the first tube to provide a gap between both tubes, a cylindrical tube inserted to the outlet end of the second cylindrical tube being smaller to a certain extent than the second cylindrical tube to provide a gap there between, air being introduced via the inlet of the first cylindrical tube via the helical blades to create a swirling flow. The swirling flow generates a centrifugal force which throws dust with large diameters toward the internal wall of the first cylindrical tube to be separated. The air with dust having smaller diameters flows into the second cylindrical tube through helical blades having an angle of less degree and smaller cross section which accelerates the swirling flow. The fine dust is thrown by centrifugal force to the wall of the second cylindrical tube and separated.

The multi-stage cyclone separator according to said patent has a disadvantage in that the acceleration of the swirling flow using helical blades in each stage is creating a new swirl but not actually an acceleration of the preceding swirl. The helical blades in the next stage destroy the fluid distribution pattern separated by density when applied with centrifugal force from preceding swirl and generates a new swirling flow. Therefore, an increase in number of stages of the multi-stage cyclone separator according to this invention does not promote the fluid separation in layers distribution by the acceleration of swirling velocity from the added cyclone stages but only generates discontinuous intermittent swirling flows from a low velocity swirling flow to high velocity ones. Said multi-stage cyclone separator according to the invention cannot generate increasing swirling acceleration and desirably increase residence time of the system by increasing stages of cyclone to increase separation efficiency as desired.

SUMMARY OF THE INVENTION

The multi-stage cyclone separator according to the present invention comprises an apparatus for creating a swirling flow being a cylindrical transmission base having an internal cavity and a side penetrable hole for introducing fluid from the outside into the internal cavity of the transmission base. The penetrable hole comprises an edge in convex curve which is curved toward the circumference of the internal wall of the transmission base wherein the beginning of the convex edge surface must have minimum angle to the emerging axis of the penetrable hole and the convex edge surface must be the closest surface compared with other surfaces surrounding the emerging axis of the penetrable hole. The composition of said side penetrable hole and edge surface is in accordance with the Coanda profile principle. When a fluid having a pressure is pressed through a side penetrable hole, it will be deflected to flow attaching to the curved surface of the edge, i.e., Coanda effect phenomenon. With the Coanda effect, the fluid in the internal cavity is drawn to flow along the convex surface of the edge mounted around the internal wall of the cavity (hereinafter referred to as "swirl generating chamber"). The swirl generating chamber has a throat of a certain extent to promote generation of swirling flow to a certain extent in the swirl generating chamber before transferring it downstream in order to induce the fluid to flow attaching to the surface on a plane as laminar swirling flow in the swirl generating chamber and the swirling flow is a force vortex, i.e., the tangential velocity is highest at its circumference and the centrifugal acceleration gradient profile is highest at its circumference, i.e., on the convex surface of the edge and gradually decreased toward the center of the swirl generating chamber. This conforms to the distribution of fluid when applied with centrifugal force wherein the fluid with higher density is thrown to outer circumference while the fluid with lower density flows in the inner circumference. The details of this apparatus for creating a swirling flow is in accordance with the Thai patent No. 41173. The present apparatus for creating a swirling flow is inserted in a cylindrical tube of a cyclone separator with a gap provided to a certain extent between the cylindrical tube of the cyclone separator and a cylindrical base of the apparatus for creating a swirling flow so as to be a space for distributing the fluid into the penetrable hole of the transmission base of the apparatus for creating a swirling flow wherein the inlet is formed on lateral side the cylindrical tube of the cyclone separator or the inlet is installed axially at the upstream open end of the cylindrical tube of the cyclone separator. The above is primary swirl creating section.

Following the primary swirl creating section, a swirl acceleration section will be described which comprises a cylindrical tube coaxially coupled to the primary swirl creating section. The cylindrical tube is inserted with an apparatus for accelerating a swirling flow formed as a conic transmission base having an internal cavity wherein a gap of a certain extent is provided between the cylindrical tube and the conic transmission base of the apparatus for accelerating a swirling flow so as to be a space for distribution the fluid into the penetrable hole of the apparatus for accelerating a swirling flow and wherein the fluid inlet is formed on lateral side the cylindrical tube. The apparatus for accelerating a swirling flow is formed as a conic transmission base having an internal cavity wherein the upstream open end of the conic transmission base has a larger diameter than that of the downstream open end of the transmission base, wherein a penetrable hole is formed in lateral side of the transmission base, the penetrable hole comprising a convex surface edge curved toward the circumference of an internal wall of the transmission base, wherein the beginning of the convex edge surface must have minimum angle to the emerging axis of the penetrable hole and the convex edge surface must be the closest surface compared with other surfaces surrounding the emerging axis of the penetrable hole. The arrangement of the side penetrable hole and convex surface of the edge is in accordance with the configuration of the Coanda profile consequently causing a Coanda effect which deflects the fluid passing through side penetrable holes such that it flows attaching on the convex surface and draws the fluid in the internal cavity (hereinafter referred to as "swirl accelerating chamber") to flow in and form a laminar swirling flow in the swirl accelerating chamber and the swirling flow is a force vortex. Since the diameter of the upstream open end of the transmission base of the apparatus for accelerating a swirling flow is larger than that of the downstream open end of the transmission base and the circumference of the internal wall of the swirl accelerating chamber is gradually shorten along the slope, the acceleration of the swirling flow is increased along the longitudinal direction of the swirl accelerating chamber.

When the pressure in the fluid distributing chamber of the swirl acceleration section is set higher than the pressure in the fluid distribution chamber of the primary swirl creating section, the velocity of the swirl on the internal wall of the swirl accelerating chamber will be higher than the swirling velocity in the upstream portion in the primary swirl creating chamber and the acceleration can be continuously increased along the longitudinal direction of the swirl accelerating chamber. As a result of the above-mentioned Coanda effect, the fluid in the swirl accelerating chamber which is transmitted from the upstream of the primary swirl creating chamber is drawn thereto and accelerated in accordance with the higher velocity of the swirling in the swirl accelerating chamber to form a laminar swirling flow without agitating the preceding swirl. The preceding swirl and the fluid distribution are sustained while the increased acceleration of the swirling of fluid without agitation will increases the centrifugal force applied to the fluid. Therefore, the separation efficiency of the fluid with different densities is increased and thus the distribution of fluid layers are more distinguished in layers of density wherein the fluid with higher density flows in outer circumference and the fluid with lower density flows in inner circumference.

Following the swirl acceleration section, a fluid separation section will be described which comprises a cylindrical tube fixed on a flange and serving as a fluid transfer tube provided in a longitudinal direction which is smaller than and inserted axially into the center of outlet of the swirl accelerating chamber wherein a gap is provided to a certain extent between the outlet of the swirl acceleration section and the external wall of the fluid transfer tube. When a fluid flows in a swirling flow with continuously ascending velocity, the heavy phase fluid is thrown to flow in outer circumference and the light phase fluid flows in inner circumference. When the fluid reach the connection portion between the swirl acceleration section and the fluid separation section, the heavy phase fluid will be screened out via the gap between the outlet and the external wall of the cylindrical tube for fluid transfer (hereinafter referred to as "separation chamber") and the light phase flowing in the inner circumference will be separated via the cylindrical tube for fluid transfer. The swirl of fluid separated via the gap for fluid separation will be decayed in reservoir having a properly controlled pressure and the heavy phase fluid is forced out through the outlet.

The apparatus for creating a swirling flow and the apparatus for accelerating a swirling flow according to the present invention create a swirling flow and acceleration of the swirl at circumference of the internal wall of the swirling generating chamber and the swirl accelerating chamber. The Coanda effect will induce the fluid in said chambers to swirl at increasing acceleration without agitating the preceding swirl so that the additional swirl acceleration section which is subsequently connected to the fluid separation section can be added to the system to increase the swirling velocity and the residence time as desired.

The objective of the invention is to increase the efficiency of the cyclone separator by addition of cyclone stages to continuously accelerate the swirling velocity without causing a turbulent flow and to increase residence time and to provide a laminar swirling flow having a centrifugal acceleration gradient profile of force vortex, i.e., the acceleration of centrifugal force is highest at its circumference and is decreased toward the center, which is the preferred centrifugal force profile for separation of fluids in according to different fluid densities when applied with centrifugal force.

In accordance with an exemplary embodiment of the subject disclosure, there is provided a multi-stage axial flow cyclone separator comprising a primary swirl creating section, a swirl acceleration section, and a fluid separation section. The primary swirl creating section comprises an outer structure having an open end and an inside fluid distribution chamber for distributing fluid received from a primary fluid inlet formed as at least one hole on a lateral side of the outer structure or as at least one tube extending from the lateral side of the outer structure for serving as ports for transferring fluid to the fluid distribution chamber for transferring to a primary swirl generating chamber of an apparatus for creating a swirling flow mounted inside the outer structure. The apparatus for creating a swirling flow is formed as an axial structure placed wholly or partially inside the outer structure wherein the inside thereof is formed as a cylindrical primary swirl generating chamber and having at least one lateral side penetrable hole for transferring fluid to the primary swirl generating chamber. The swirl acceleration section comprises an outer structure having an open end in fluid communication with the primary swirl creating section and an inside fluid distribution chamber for distributing fluid received from a fluid inlet formed as at least one hole on a lateral side of the outer structure or at least one tube extending from the lateral side of the outer structure for serving as ports for transferring fluid to the fluid distribution chamber for transferring to a swirl acceleration chamber of an apparatus for accelerating a swirling flow. The swirl apparatus for accelerating a swirling flow is formed as an axial structure disposed wholly or partially inside the outer structure having an inside conic swirl acceleration chamber for receiving fluid from the fluid distribution chamber and having at least one lateral side penetrable hole on a lateral side of the apparatus for accelerating a swirling flow for serving as inlets for fluid flowing from the fluid distribution chamber into the swirl accelerating chamber. The fluid separation section comprises an outer structure having an open end in fluid communication with the swirl acceleration section and an inside space for gathering a heavy phase of the fluid for transfer through a lateral side outlet formed as at least one hole on a lateral side of the outer structure or at least one tube extending from the lateral side of the outer structure for serving as ports for transferring the heavy phase fluid, and a fluid transfer tube axially mounted in a center inside the outer structure. The fluid transfer tube is formed as a cylindrical tube having an inside cylindrical cavity for serving as an outlet of light phase fluid and to provide an annulus space, wherein a diameter of the fluid transfer tube is smaller than a circular hole formed on a center of the outlet open end of the swirl acceleration section, and wherein the annulus space serves as a space for fluid separation for separating heavy phase fluid and transferring the fluid to the fluid gathering space.

An aspect of the exemplary embodiment is that the primary swirl generating chamber has a throat for promoting formation of a swirling flow in the primary swirl generating chamber in a sufficient amount and velocity before it is transferred. The open end of the outer structure is formed as a closure plate to direct the fluid only through an inlet of the primary fluid inlet. The primary fluid inlet axially draws the fluid from an upstream open end, the primary fluid inlet comprising the closure plate for closing only the open end of the apparatus for creating a primary swirling flow at the upstream open end and opening a space around the apparatus for creating the primary swirling flow to allow the fluid to flow in the fluid distribution chamber and to the primary swirl generating chamber through the side penetrable hole. The multi-stage axial flow cyclone separation further comprises at least one conic extension comprising one of a conical accelerating section longitudinally connected with a fluid separation section or a cylindrical acceleration section longitudinally connected with the fluid separation section to be coupled to the fluid separation section. Furthermore, fluid separation section can be a divergent type of fluid separation section.

Another aspect of the exemplary embodiment is that an edge surface next to the lateral side penetrable hole is a convex surface wherein a beginning of the convex surface has a minimum angle to an emerging axis of the lateral side penetrable hole and the convex surface is closer compared with other surfaces surrounding the emerging axis of the lateral side penetrable hole, wherein the composition of said lateral side penetrable hole and the convex surface of the edge surface next to the lateral side penetrable hole is in accordance with a Coanda profile wherein fluid through the penetrable hole is deflected to the convex surface creating a Coanda effect inducing the fluid in the primary swirl generating chamber to flow along a flow line A in a laminar manner on a plane of the curved surface such that a laminar swirling flow is formed in the primary swirl generating chamber.

Another aspect of the exemplary embodiment is that the an edge surface of the lateral side penetrable hole is a convex surface, a beginning of the convex surface having a minimum angle to an emerging axis of the lateral side penetrable hole and the convex surface is closer compared with other surfaces surrounding the emerging axis of the side penetrable hole wherein a composition of said lateral side penetrable hole and the convex surface is in accordance with a Coanda profile wherein fluid pressed through the penetrable hole is deflected to the convex surface creating a Coanda effect inducing the fluid in the swirl accelerating chamber transferred from the primary swirl creating section to flow along a flow line A' in a laminar manner on a plane of the convex surface such that a laminar swirling flow is formed in the swirl accelerating chamber, wherein a diameter of an upstream open end is larger than that of a downstream open end of a transmission base of the apparatus for accelerating the swirling flow, wherein the acceleration of the fluid is increased as a circumference is shortened along the slope of a conic base of the apparatus for accelerating the swirling flow before the fluid is transferred to the fluid separation section.

Another aspect of the exemplary embodiment is that one open end of the outer structure of the fluid separation section is formed as an outer attaching flange for serving as an edge for attaching the fluid transfer tube.

In accordance with an exemplary embodiment of the subject disclosure, there is provided a multi-stage axial flow cyclone separator comprising a primary swirl creating section, a swirl acceleration section and a fluid separation section. The primary swirl creating section includes an outer structure having an open end, a fluid distribution chamber, and a primary fluid inlet adjacent the outer structure of the primary swirl creating section, a primary swirl generating chamber, and a side penetrable hole for transferring fluid from the fluid distribution chamber to the primary swirl generating chamber. The swirl acceleration section includes an outer structure having an open end in fluid communication with the primary swirl creating section, an inside fluid distribution chamber and a fluid inlet adjacent the outer structure of the swirl acceleration section, a swirl acceleration chamber, and a side penetrable hole transferring fluid from the fluid distribution chamber to the swirl acceleration chamber. The fluid separation section includes an outer structure having an open end in fluid communication with the swirl acceleration section, and an inside space, a lateral side outlet adjacent the outer structure of the outer structure of the fluid separation section, and a fluid transfer tube axially mounted to a center inside the outer structure.

BRIEF DESCRIPTION OF THE DRAWINGS

FIG. 1B is a cross section of the multi-stage axial flow cyclone separator of FIG. 1A along B-B. FIG. 1C is a cross section of the multi-stage axial flow cyclone separator of FIG. 1A along C-C.

DETAILED DESCRIPTION OF THE INVENTION

Figure 1B:
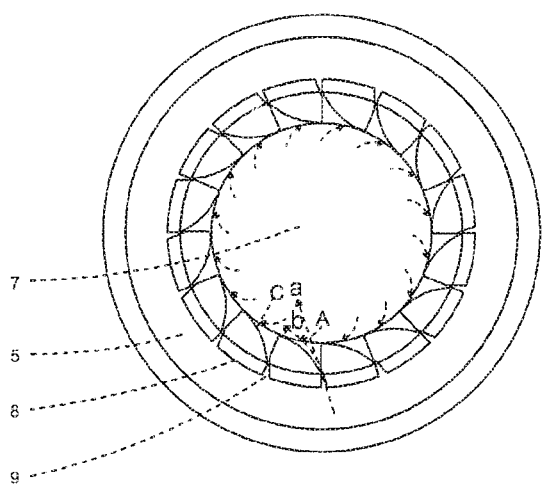
FIGS. 1A-C show the multi-stage axial flow cyclone separator according to the present invention.
Figure 1C:
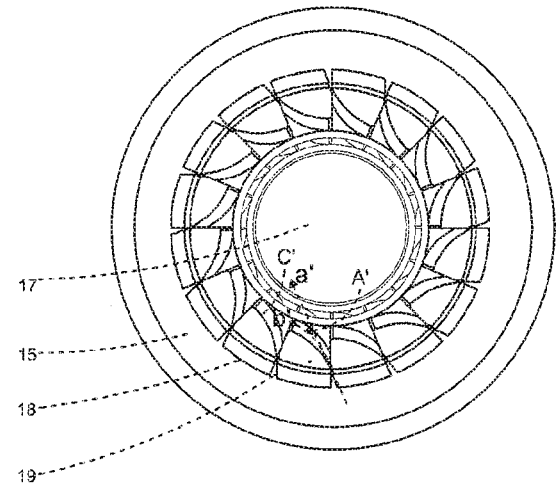
Figure 1A:
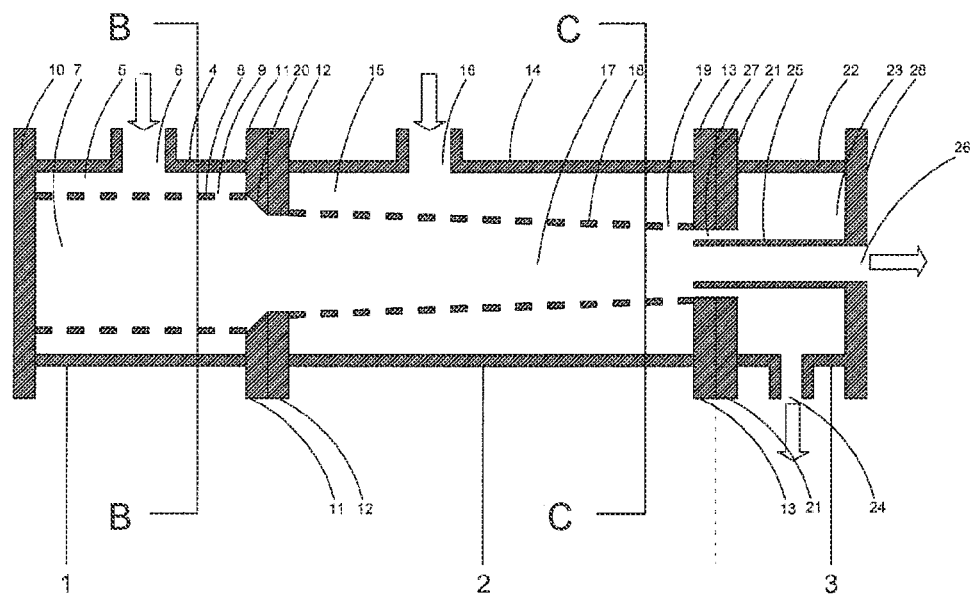

According to FIGS. 1A-C, the multi-stage axial flow cyclone separator according to the present invention comprises a primary swirl creating section 1 connected to a swirl acceleration section 2 and connected to a fluid separation section 3 wherein the primary swirl creating section 1 comprises an outer structure of the primary swirl creating section 4 formed as an outer structure having an open end and an inside cavity for fluid distribution 5 for distribution fluid received from a primary fluid inlet 6 wherein the primary fluid inlet 6 is formed as at least one hole on a lateral side of the outer structure of the primary swirl creating section 4 or as at least one tube extending from lateral side of the outer structure of the primary swirl creating section 4 for serving as ports for transferring fluid from the outside to the fluid distribution chamber 5 for transferring to a swirl generating chamber 7 of an apparatus for creating a swirling flow 8 mounted inside the outer structure of the primary swirl creating section 4 wherein the apparatus for creating a swirling flow 8 is formed as an axial structure placed wholly or partially inside the outer structure of the primary swirl creating section 4 wherein the inside thereof is formed as a cylindrical space for creating primary swirling flow 7 and at least one lateral side penetrable hole 9 for transferring fluid to the space for creating primary swirling flow 7 wherein an hole side edge surface of the lateral side penetrable hole 9 is formed as a convex surface c wherein the beginning of said surface have minimum angle to the emerging axis a of the side penetrable hole 9 and the convex surface c is the closest surface compared with other surfaces surrounding the emerging axis a of the side penetrable hole 9. The composition of the lateral side penetrable hole 9 and the convex surface c of the hole side edge surface of the lateral side penetrable hole 9 is in accordance with the Coanda profile. The fluid pressed through the penetrable hole will be deflected to flow attaching to the convex surface c shown as flow line b creating Coanda effect inducing the fluid in the primary swirl generating chamber 7 to flow along the flow line A to flow in a laminar manner on the plane of the curved surface c such that a laminar swirling flow is formed in the primary swirl generating chamber 7 wherein the swirl generating chamber 7 has a throat 20 for promoting formation of a swirling flow in the primary swirl generating chamber 7 in a sufficient amount and velocity before it is transferred to the swirl acceleration section 2 and one open end of the outer structure of the primary swirl creating section 4 is formed as a closure plate 10 for closure in order to direct the fluid only through the inlet of the primary fluid inlet 6 and the primary fluid inlet 6 can be alternatively designed to introduce the fluid to flow in axially from the upstream open end with a closure plate 10 for closing only the open end of the apparatus for creating a swirling flow 8, and keeping the open end, of the fluid distribution chamber 5 open to let the fluid flow into the fluid distribution chamber 5 and into the primary swirl generating chamber 7 through the lateral side penetrable hole 9 the other open end of the outer structure of the primary swirl creating section 4 is formed as a primary swirl structure attaching flange 11 for attachment to a primary swirl structure receiving flange 12 of an outer structure of the swirl acceleration section 14 and the swirl acceleration section 2 comprises the outer structure of the swirl acceleration section 14 formed as an outer structure having an open end and an inside fluid distribution chamber 15 for distribution fluid receiving from a fluid inlet 16 wherein the fluid inlet 16 is formed as at least one hole on lateral side of the outer structure of the swirl acceleration section 14 or at least one tube extending from lateral side of the outer structure of the swirl acceleration section 14 for serving as ports for transferring fluid from the outside to fluid distribution chamber 15 for transferring to swirl accelerating chamber 17 of an apparatus for accelerating a swirling flow 18 wherein the apparatus for accelerating a swirling flow 18 is formed as an axial structure disposed wholly or partially inside the outer structure of the swirl acceleration section 14 having an inside conic swirl acceleration chamber 17 mounted inside the outer structure of the swirl acceleration section 14 for receiving fluid from the fluid distribution chamber 15 and on lateral side of the apparatus for accelerating a swirling flow 18, at least one lateral side penetrable hole 19 is provided for serving as inlets for fluid flowing from the fluid distribution chamber 15 into the swirl acceleration chamber 17 wherein one open end of the outer structure of the swirl acceleration section 14 is formed as a primary swirl structure receiving flange 12 for attachment to the primary swirl structure attaching flange 11 of the primary swirl creating section 1 and the other open end of the outer structure of the swirl acceleration section 14 is formed as a fluid separation section structure receiving flange 13 for attachment to a fluid separation section structure attaching flange 21 of the fluid separation section 3 wherein the apparatus for accelerating a swirling flow 18 mounted inside the outer structure of the swirl acceleration section 14 having an axial conic tube shape disposed wholly or partially inside the outer structure of the swirl acceleration section 14 has the fluid inlet 16 on lateral side of the outer structure of the swirl acceleration section 14 for transferring fluid into the fluid distribution chamber 15, the fluid having a pressure being pressed through the lateral side penetrable hole 19 of the apparatus for accelerating a swirling flow 18 into the inside swirl accelerating chamber 17 for swirl acceleration inside the swirl acceleration chamber 17 wherein a hole side edge surface of the lateral side penetrable hole 19 is formed as a convex surface c', the beginning of the convex curve of said surface has a minimum angle to the emerging axis a' of the lateral side penetrable hole 19 and the convex surface c' is the closest surface compared with other surfaces surrounding the emerging axis a' of the penetrable hole 19. The composition of said lateral side penetrable hole 19 and the convex surface c' is in accordance with the Coanda profile. The fluid pressed through the penetrable hole will be deflected to flow attaching to the convex surface c' shown as flow line b' creating Coanda effect inducing the fluid in the swirl accelerating chamber 17 which is transferred from the primary swirl creating section 1 to flow along the flow line A' to flow in a laminar manner on the plane of the convex surface c' such that a laminar swirling flow is formed in swirl accelerating chamber 17. Since the diameter of the upstream open end is larger than that of the downstream open end of the transmission base of the apparatus for accelerating a swirling flow 18, the acceleration of the swirling flow of fluid is increased as the circumference is shorten along the slope of the conic base of the apparatus for accelerating a swirling flow 18 before the fluid is transferred to the fluid separation section 3.

The fluid separation section 3 comprises an outer structure of the fluid separation section 22 formed as an outer structure having an open end and an inside space 23 for gathering the heavy phase fluid for transfer through lateral side outlet 24 wherein the lateral side outlet 24 is formed as at least one hole on lateral side of the outer structure of the fluid separation section 22 or at least one tube extending from lateral side of the outer structure of the fluid separation section 22 for serving as ports for transferring heavy phase fluid. A fluid transfer tube 25 is mounted axially in the center inside the outer structure of the fluid separation section 22 wherein the fluid transfer tube 25 is formed as a cylindrical tube having inside cylindrical cavity 26 for serving as an outlet of light phase fluid and the diameter of the fluid transfer tube 25 is smaller than that of the open end at the outlet of the swirl acceleration section 2 which is formed as a circular hole in the center to provide an annulus space for fluid separation 27 for separating heavy phase fluid and transferring the fluid to the space 23 and one open end of the outer structure of the fluid separation section 22 is formed as the fluid separation section structure attaching flange 21 for attachment to the fluid separation section structure receiving flange 13 of the swirl acceleration section 2 and the other open end of the outer structure of the fluid separation section 22 is formed as an outer attaching flange 28 for serving as an edge for attaching the fluid transfer tube 25.

Figure 2:
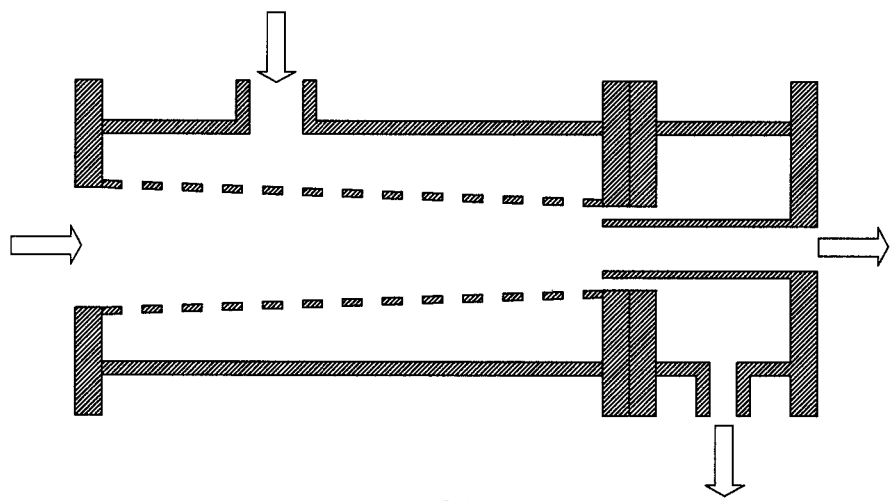
FIG. 2 shows a conic extension for accelerating a swirling flow subsequently connected to a fluid separation section of a multi-stage axial flow cyclone separator according to the present invention.
Figure 3:
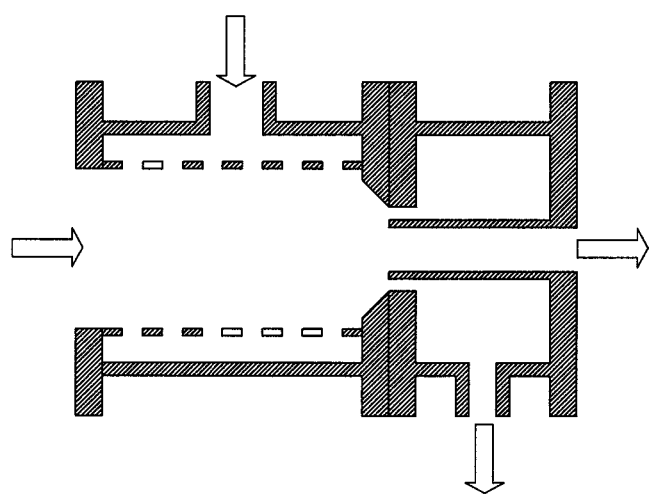
FIG. 3 shows a cylindrical extension for accelerating a swirling flow subsequently connected to a fluid separation section of a multi-stage axial flow cyclone separator according to the present invention.

The efficiency of the multi-stage axial flow cyclone separator according to the present invention can be improved by connection of extensions in various forms including one according to FIG. 2 which is a conic extension for accelerating the swirling flow subsequently connected to the fluid separation section or the one according to FIG. 3 which is a cylindrical extension for accelerating the swirling flow subsequently connected to the fluid separation. That is at least one set of extension as foresaid coupled to the fluid separation section 3 of the multi-stage axial flow cyclone separator according to the present invention.

Figure 4:
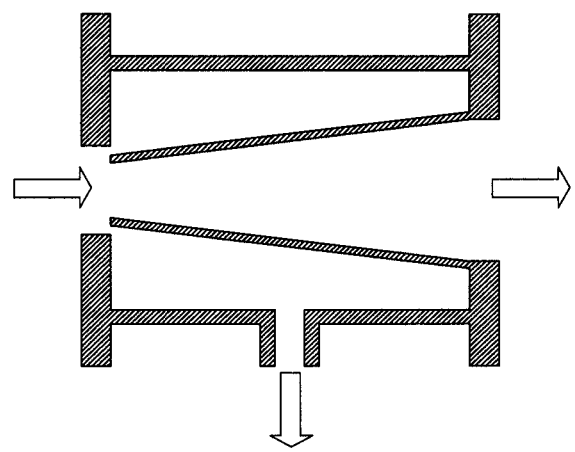
FIG. 4 shows a divergent type of fluid separation section of a multi-stage axial flow cyclone separator according to the present invention.

The multi-stage axial flow cyclone separator according to the present invention can be configured for separation of gaseous fluid by coupling to an divergent fluid separation section according to FIG. 4 instead of the fluid separation section 3 according to FIGS. 1A-C.

According to the outer structure of the primary swirl creating section 4 of the primary swirl creating section 1 mounted with the apparatus for creating a swirling flow 8, the swirling flow of the fluid is formed as a force vortex and accelerated by the apparatus for accelerating a swirling flow 18 which is also a formation of a force vortex swirl thereby creating a profile of centrifugal force distribution of force vortex i.e. centrifugal force or tangential velocity is highest at circumference of the swirl generating chamber. The centrifugal force applied to the fluid creates a distribution of the fluid in a profile that the heavy phase fluid flows in outer circumference and the light phase fluid flows in inner circumference. When reaching the space for fluid separation, the heavy phase fluid will flow through the space for fluid separation 27 into a gathering chamber 23 and exit via the outlet 24 but the light phase of the fluid will flow in inner circumference and exit via a cylindrical cavity 26 of the fluid transfer tube 25.

The multi-stage axial flow cyclone separator according to the present invention is designed to sequentially increase the pressure in fluid distribution chamber in each stage from upstream to downstream and to provide a pressure at the downstream outlet that is lower than that of the upstream outlet in order to continuously accelerate the swirling flow.

The invention claimed is:

1. A multi-stage axial flow cyclone separator comprising:
   a primary swirl creating section (1) comprising an outer structure (4) having an open end and an inside fluid distribution chamber (5) for distributing fluid received from a primary fluid inlet (6) formed as at least one hole on a lateral side of the outer structure (4) or as at least one tube extending from the lateral side of the outer structure (4) for serving as ports for transferring fluid to the fluid distribution chamber (5) for transferring to a primary swirl generating chamber (7) of an apparatus for creating a swirling flow (8) mounted inside the outer structure (4),
   wherein the apparatus for creating a swirling flow (8) is formed as an axial structure placed wholly or partially inside the outer structure (4) wherein the inside thereof is formed as a cylindrical primary swirl generating chamber (7) and having at least one lateral side penetrable hole (9) for transferring fluid to the primary swirl generating chamber (7), an edge surface next to the lateral side penetrable hole (9) is a convex surface c wherein a beginning of the convex surface has a minimal angle to an emerging axis a of the lateral side penetrable hole (9) and the convex surface c is closer compared with other surfaces surrounding the emerging axis a of the lateral side penetrable hole (9), wherein the composition of said lateral side penetrable hole (9) and the convex surface c of the edge surface next to the lateral side penetrable hole (9) is in accordance with a Coanda profile wherein fluid through the penetrable hole is deflected to the convex surface c creating a Coanda effect inducing the fluid in the primary swirl generating chamber (7) to flow along a flow line A in a laminar manner on a plane of the curved surface c such that a laminar swirling flow is formed in the primary swirl generating chamber (7);
   a swirl acceleration section (2) comprising an outer structure (14) having an open end in fluid communication with the primary swirl creating section (1) and an inside fluid distribution chamber (15) for distributing fluid received from a fluid inlet (16) formed as at least one hole on a lateral side of the outer structure (14) or at least one tube extending from the lateral side of the outer structure (14) for serving as ports for transferring fluid to the fluid distribution chamber (15) for transferring to a swirl acceleration chamber (17) of an apparatus for accelerating a swirling flow (18),
   wherein the apparatus for accelerating a swirling flow (18) is formed as an axial structure disposed wholly or partially inside the outer structure (14) having an inside conic swirl acceleration chamber (17) for receiving fluid from the fluid distribution chamber (15) and having at least one lateral side penetrable hole (19) on a lateral side of the apparatus for accelerating a swirling flow (18) for serving as inlets for fluid flowing from the fluid distribution chamber (15) into the swirl accelerating chamber (17), wherein an edge surface of the lateral side penetrable hole is a convex surface, a beginning of the convex surface having a minimal angle to an emerging axis of the lateral side penetrable hole (19) and the convex surface c' is closer compared with other surfaces surrounding the emerging axis a' of the side penetrable hole (19) wherein a composition of said lateral side penetrable hole (19) and the convex surface c' is in accordance with a Coanda profile wherein fluid pressed through the penetrable hole is deflected to the convex surface c' creating a Coanda effect inducing the fluid in the swirl accelerating chamber transferred from the primary swirl creating section (1) to flow along a flow line A' in a laminar manner on a plane of the convex surface c' such that a laminar swirling flow is formed in the swirl accelerating chamber (17), wherein a diameter of an upstream open end is larger than that of a downstream open end of a transmission base of the apparatus for accelerating the swirling flow (18), wherein the acceleration of the fluid is increased as a circumference is shortened along the slope of a conic base of the apparatus for accelerating the swirling flow (18) before the fluid is transferred to a fluid separation section (3); and the fluid separation section (3) comprising an outer structure (22) having an open end in fluid communication with the swirl acceleration section (2) and an inside space (23) for gathering a heavy phase of the fluid for transfer through a lateral side outlet (24) formed as at least one hole on a lateral side of the outer structure (22.) or at least one tube extending from the lateral side of the outer structure (22) for serving as ports for transferring the heavy phase fluid, and a fluid transfer tube (25) axially mounted in a center inside the outer structure (22), wherein the fluid transfer tube (25) is formed as a cylindrical tube having an inside cylindrical cavity (26) for serving as an outlet of light phase fluid and to provide an annulus space (27), wherein a diameter of the fluid transfer tube (25) is smaller than a circular hole formed on a center of the outlet open end of the swirl acceleration section (2), and wherein the annulus space (27) serves as a space for fluid separation for separating heavy phase fluid and transferring the fluid to the fluid gathering space (23).

2. The multi-stage axial flow cyclone separator according to claim 1, wherein the primary swirl generating chamber (7) has a throat (20) for promoting formation of a swirling flow in the primary swirl generating chamber (7) in a sufficient amount and velocity before it is transferred.

3. The multi-stage axial flow cyclone separator according to claim 1, wherein the primary fluid inlet (6) axially draws the fluid from an upstream open end, the primary fluid inlet (6) comprising the closure plate (10) for closing only the open end of the apparatus for creating a primary swirling flow (8) at the upstream open end and opening a space around the apparatus for creating the primary swirling flow to allow the fluid to flow in the fluid distribution chamber (5) and to the primary swirl generating chamber (7) through the side penetrable hole (9).

4. The multi-stage axial flow cyclone separator according to claim 1, further comprising at least one conic extension comprising one of a conical accelerating section longitudinally connected with a fluid separation section or a cylindrical acceleration section longitudinally connected with the fluid separation section to be coupled to the fluid separation section (3).

5. The multi-stage axial flow cyclone separator according to claim 1, wherein the fluid separation section (3) is a divergent type of fluid separation section.

6. The multi-stage axial flow cyclone separator according to claim 1, wherein the open end of the outer structure (4) is formed as a closure plate (10) to direct the fluid only through an inlet of the primary fluid inlet (6).

7. The multi-stage axial flow cyclone separator according to claim 1, wherein one open end of the outer structure of the fluid separation section (22) is formed as an outer attaching flange (28) for serving as an edge for attaching the fluid transfer tube (25).

8. A multi-stage axial flow cyclone separator comprising:
a primary swirl creating section (1) including:
an outer structure (4) having:
an open end, and
a fluid distribution chamber (5),
a primary fluid inlet (6) adjacent the outer structure (4) of the primary swirl creating section (1),
a primary swirl generating chamber (7), and
a side penetrable hole (9) for transferring fluid from the fluid distribution chamber (5) to the primary swirl generating chamber (7);
a swirl acceleration section (2) including:
an outer structure (14) having:
an open end in fluid communication with the primary swirl creating section (1), and
an inside fluid distribution chamber (15),
a fluid inlet (16) adjacent the outer structure (14) the swirl acceleration section (2),
a swirl acceleration chamber (17), and
a side penetrable hole (19) transferring fluid from the fluid distribution chamber (15) to the swirl acceleration chamber (17);
a fluid separation section (3) including:
an outer structure (22) having:
an open end in fluid communication with the swirl acceleration section (2), and
an inside space (23),
a lateral side outlet (24) adjacent the (22) of the fluid separation section (3), and
a fluid transfer tube (25) axially mounted to a center inside the outer structure (22);
an apparatus for creating a swirling flow (8) inside the outer structure (4) of the primary swirl creating section (1), the apparatus including:
the primary swirl generating chamber (7) formed as a cylindrical primary swirl generating chamber (7).
the side penetrable hole (9) formed as a lateral side penetrable hole (9), and
an edge surface adjacent the lateral side penetrable hole (9), the edge surface having a convex surface beginning section having a minimal angle relative to an emerging axis of the lateral side penetrable hole (9); and
an apparatus for accelerating a swirling flow (18) inside the outer structure (14) of the swirl acceleration section (2), the apparatus including:
the swirl acceleration chamber (17) formed as an inside conic swirl acceleration chamber (17),
the side penetrable hole (19) formed as a lateral side penetrable hole (19);

an edge surface adjacent the lateral side penetrable hole (19), the edge surface having a convex surface beginning section having a minimal angle relative to an emerging axis of the lateral side penetrable hole (19), a downstream open end, and an upstream open end, wherein a diameter of the upstream open end is larger than a diameter of the downstream open end.

9. The multi-stage axial flow cyclone separator according to claim 8, wherein the fluid transfer tube (25) of the fluid separation section (3) is a cylindrical tube having an inside cylindrical cavity (26) with a diameter less than a diameter of the downstream open end of the swirl acceleration section (2).

10. The multi-stage axial flow cyclone separator according to claim 8, wherein the open end of the outer structure (22) of the fluid separation section (3) includes an outer flange (28) for attaching to the fluid transfer tube (25).

11. A multi-stage axial flow cyclone separator comprising:

a primary swirl creating section (1) including:

an outer structure (4) having:

an open end, and a fluid distribution chamber (5), a primary fluid inlet (6) adjacent the outer structure (4) of the primary swirl creating section (1), a primary swirl generating chamber (7), a side penetrable hole (9) formed as a lateral side penetrable hole (9) for transferring fluid from the fluid distribution chamber (5) to the primary swirl generating chamber (7), and an edge surface adjacent the lateral side penetrable hole (9), the edge surface having a convex surface beginning section having a minimal angle relative to an emerging axis of the lateral side penetrable hole (9);

a swirl acceleration section (2) including:

an outer structure (14) having:

an open end in fluid communication with the primary swirl creating section (1), and an inside fluid distribution chamber (15), a fluid inlet (16) adjacent the outer structure (14) of the swirl acceleration section (2), and a swirl acceleration chamber (17), and a side penetrable hole (19) formed as a lateral side penetrable hole (19) for transferring fluid from the fluid distribution chamber (15) to the swirl acceleration chamber (17), and an edge surface adjacent the lateral side penetrable hole (19), the edge surface having a convex surface beginning section having a minimal angle relative to an emerging axis of the lateral side penetrable hole (19); and a fluid separation section (3) including:

an outer structure (22) having:

an open end in fluid communication with the swirl acceleration section (2), and an inside space (23), a lateral side outlet (24) adjacent the outer structure (22) of the fluid separation section (3), and a fluid transfer tube (25) axially mounted to a center inside the outer structure (22).

12. The multi-stage axial flow cyclone separator according to claim 11, further comprising an apparatus for creating a swirling flow (8) inside the outer structure (4) of the primary swirl creating section (1), the apparatus including the primary swirl generating chamber (7) formed as a cylindrical primary swirl generating chamber (7).

13. The multi-stage axial flow cyclone separator according to claim 11, further comprising an apparatus for accelerating a swirling flow (18) inside the outer structure (14) of the swirl acceleration section (2), the apparatus including:

the swirl acceleration chamber (17) formed as an inside conic swirl acceleration chamber (17);

a downstream open end; and an upstream open end, wherein a diameter of the upstream open end is larger than a diameter of the downstream open end.

14. The multi-stage axial flow cyclone separator according to claim 13, wherein the fluid transfer tube (25) of the fluid separation section (3) is a cylindrical tube having an inside cylindrical cavity (26) with a diameter less than a diameter of the downstream open end of the swirl acceleration section (2).

15. The multi-stage axial flow cyclone separator according to claim 11, wherein the open end of the outer structure (22) of the fluid separation section (3) includes an outer flange (28) for attaching to the fluid transfer tube (25).

* * * * *